United States Patent [19]

Barton

[11] 3,943,518
[45] Mar. 9, 1976

[54] DOPPLER ILS RECEIVER WITH BEAT SIGNAL SCAN SYNCHRONIZATION
[75] Inventor: Paul Barton, Bishop Stortford, England
[73] Assignee: International Standard Electric Corporation, New York, N.Y.
[22] Filed: July 15, 1974
[21] Appl. No.: 488,565

[30] Foreign Application Priority Data
July 19, 1973  United Kingdom.............. 34454/73

[52] U.S. Cl. ........................ 343/108 M; 343/106 D
[51] Int. Cl.² ........................ G01S 1/18; G01S 1/38
[58] Field of Search .................... 343/108 M, 106 D

[56] References Cited
UNITED STATES PATENTS
3,670,337   6/1972   Earp et al...................... 343/108 M
3,866,227   2/1975   Ruvin.............................. 343/106 D Primary Examiner—T. H. Tubbesing
Assistant Examiner—Richard E. Berger
Attorney, Agent, or Firm—William T. O'Neil

[57] ABSTRACT

Radio navigation receiver apparatus for operation with ground beacon equipment of the simulated Doppler type (having a commutated array).

The receiver derives a beat between the received ground beacon (commutated) signals and a reference signal also from the ground beacon. Angular information is extracted from this beat signal. Means are included for determining the commutation times and scan reversals at the receiver location, so that the effect of phase transients can be ameliorated by discriminating against the received signal at these phase transient times.

4 Claims, 5 Drawing Figures

DOPPLER ILS RECEIVER WITH BEAT SIGNAL SCAN SYNCHRONIZATION

BACKGROUND OF THE INVENTION

1. Field of the Invention

This invention relates generally to radio navigation systems of the Doppler type, and particularly to remote angle determining receivers therefor.

2. Description of the Prior Art

In Doppler radio navigation systems, the ground beacon (commutated array) transmits bidirectional scans defined as involving:

a. commutation of a first radio frequency discretely and successive to the radiating elements of a linear array so as to simulate constant velocity bidirectional (back and forth) scanning of the array, whereby a main bearing signal is transmitted which, as "seen" by a remote receiver in the system, undergoes a Doppler frequency shift proportional to the sine of the angle said remote receiver makes with the normal to the axis of the array.

b. Simultaneous transmission of a reference signal of a second radio frequency (offset from the first), whereby the receiver is able to derive a Doppler beat waveform containing a frequency indicative of the said angle.

c. Changing the sign of the difference (offset) between the commutated frequency and the reference frequency at each half period of the bidirectional scan, thereby to provide compensation for the change in the sense of the Doppler frequency shift imparted to the commutated signal on reversal of the direction of scan.

d. precession of the phase of the commutated signal at the commencement of each bidirectional scan, whereby successive scans are not identical (a form of digitization).

A form of beacon having the above transmission format is described in British Pat. No. 1,234,541. The specification of that patent also describes how the Doppler frequency displacement of the commutated signal may be detected and measured by digital methods in an associated remote receiver.

In order to effect digital counting of the Doppler frequency in the receiver in such a way that the signal is measured only during defined portions of the scan, it is necessary to derive scan timing signals to control the time over which the period of received signals are measured by a computing counter. This can be done by examining the r.f. signal and detecting when the frequency of the commutated signal changes at the end of each scan. However, the circuitry required for this detection is quite complicated.

SUMMARY OF THE INVENTION

In conisderation of the aforementioned state of the prior art and the disadvantages thereof, it may be said to be the general object of the invention to provide a simplified scan timing extraction device in the said remote receiver.

According to the invention there is provided a radio navigation receiver for use in a Doppler radio navigation system having a transmission format with digitized bidirectional scans as hereinbefore defined. The said receiver also includes means for deriving a Doppler beat information signal from the received signals, first circuits responsive to said Doppler signal for determining the time at which the direction of each scan is reversed, and additional circuits synchronized by the first circuits for determining the frequency of the Doppler signal during each said scan cycle.

The invention will be better understood from the following description in conjunction with the accompanying drawings.

DESCRIPTION OF THE PREFERRED EMBODIMENT

Figure 1:
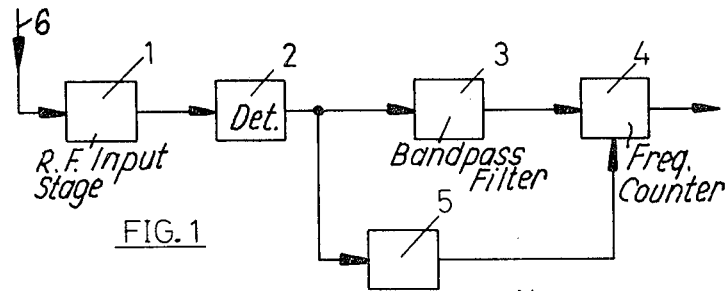
FIG. 1 is a block schematic diagram of a radio navigation receiver embodying the invention.

Referring now to FIG. 1, the receiver block diagram will be explained.

The receiver comprises an r.f. input stage 1 whereat signals received at 6 in accordance with the defined transmission format from an associated ground beacon are subjected to the necessary frequency changing and amplification to be passed to detector stage 2 at IF frequency. The output of 2 is the Doppler beat waveform.

After the detector 2 there is a bandpass filter 3 covering the range of the required Doppler beat frequency, to select the direct path signal and reject or at least reduce multi-path signals. This technique is known, per se.

The next stage, 4, comprises a frequency counter (zero crossing detector) and associated circuitry required to produce an output which is fed to any suitable read out, e.g., a zero center d.c. meter or other form of bearing information display.

In order to derive the bearing information within stage 4, it is necessary to control the time over which the period of filtered signals are measured by the counter, and this period is fundamentally the scan period. In practice it may be slightly less than the full scan period as will become apparent later in the description.

The remaining stage 5 in FIG. 1, is a scan timing derivation stage having as its input the Doppler beat waveform from the detector 2 and as its output scan synchronizing signals for the counting and processing stage 4.

Figure 2:
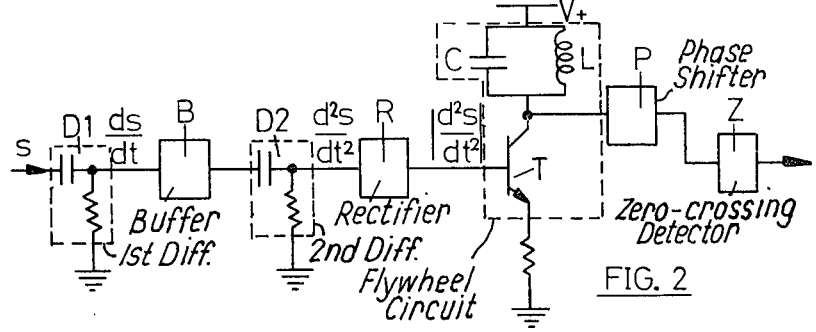
FIGS. 2 and 3 show details of alternative forms of scan timing extraction circuits.

This scan timing derivation stage 5 may typically be constituted by the arrangement shown in FIG. 2 which comprises a first differentiator D1, a buffer B, a second differentiator D2, a rectifier R, a flywheel circuit comprising a transistor T with a high-Q resonant (LC) circuit connected to its collector, a phase shifter P and a zero crossing detector Z.

Figure 4:
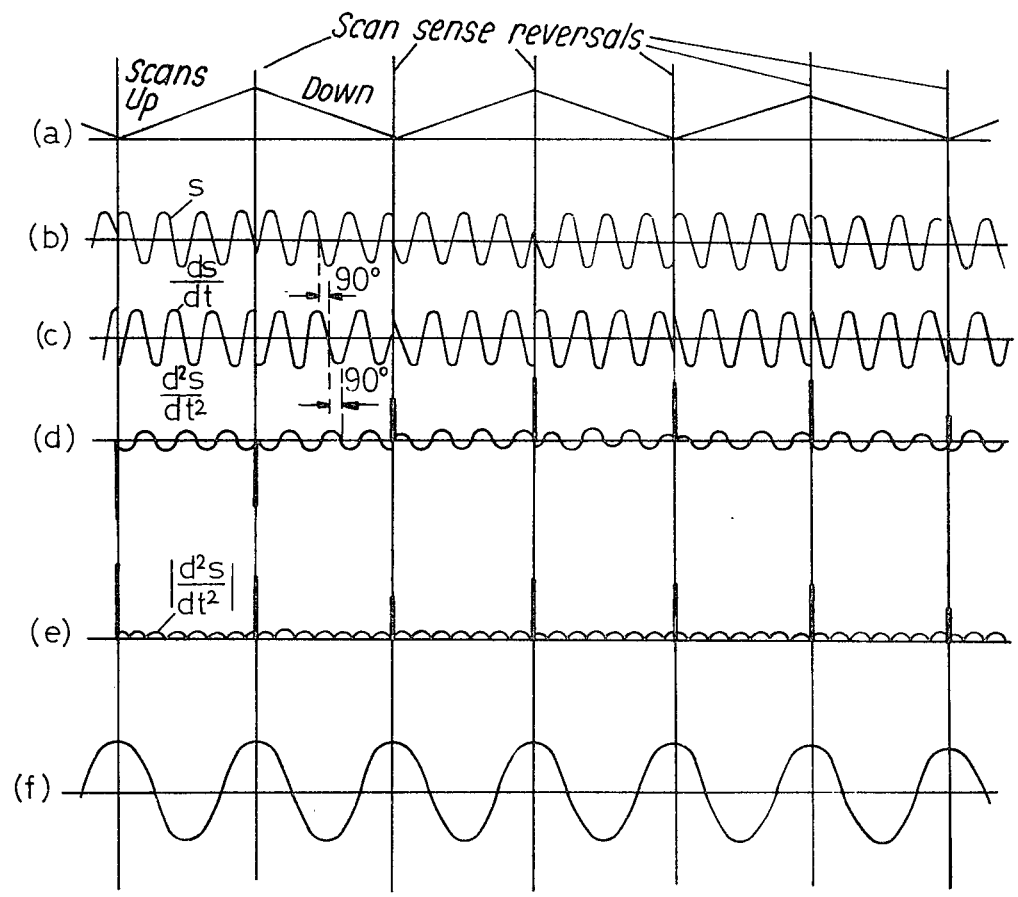
FIGS. 4 and 5 show waveforms concerned with operation of the circuits of FIGS. 2 and 3, respectively.

Referring now also to FIG. 4, it is assumed that the beacon array involved is vertically oriented for elevation angle determination at the receiver, whereby there are up and down scans depicted as a function of time at FIG. 4(a). As a result of the aforementioned transmission format, the Doppler beat signal S, FIG. 4(b) contains phase discontinuities at the scan sense reversals regardless of the bearing frequency, although the magnitude of the phase transient will vary at successive scan interfaces throughout the digitization cycle because the scan frequency and beat are never (or seldom) synchronous or instantaneously harmonically related.

The signal s is applied to the first differentiator D1 whose output ($ds/dt$) with its resulting 90° phase advance on the input, is shown in FIG. 4(c). Further differentiation of $ds/dt$ by the second differentiator D2 results in the waveform $d^2s/dt^2$ shown in FIG. 4(d), with a further 90° phase advance. Phase discontinuities in the original Doppler beat waveforms occurring at the scan ends, result in short pulses appearing in the doubly differentiated signal $d^2s/dt^2$. This signal is rectified by rectifier R, to produce the waveform $|d^2s/dt^2|$ (FIG. 4(e)), and this rectifier output is then used to "ring" the flywheel circuit at its natural resonant frequency (preselected to equal the scan rate). The output (FIG. 4(f)) of the resonant circuit is advanced by 90° in the phase shifter P, so that as applied to the zero crossing detector Z, the zero crossings of the flywheel circuit output then coincide with the instant of scan start.

The zero crossing detector Z controls the counting stage 4 (FIG. 1) in synchronism with the scan rate, counting being arranged to commence shortly after the commencement of each scan, for example, by arranging for a trigger circuit to be energized by each scan commencement zero crossing after a brief delay. This short delay mitigates the effect of spurious signals passing through the filter 3 at the instant of scan change when the Doppler beat waveform is suffering a phase discontinuity.

In the circuit of FIG. 2, to prevent contamination by noise, the differentiating circuits should not be unnecessarily wideband. In other words, the 12dB/octave rising characteristic associated with an ideal double differentiator must be limited to some maximum frequency, for example, to twice the offset frequency as specified in the transmission format description.

The above-described scan timing derivation circuit is suitable for use with the described transmission format wherein additionally there is blending at the transmitter, that is to say a technique in which the signal to each antenna is tapered and also time overlaps the transmissions from adjacent radiating elements. The primary use of the technique is to reduce the r.f. bandwidth of the transmission. This blending technique smooths out the element to element phase jump, yielding an almost linear phase trajectory.

With hard switching of the radiating elements, the phase jump between elements can be comparable with the phase discontinuity at the scan ends, and with the circuit of FIG. 2, the desired signal may be obscured due to these commutation jumps.

Figure 3:
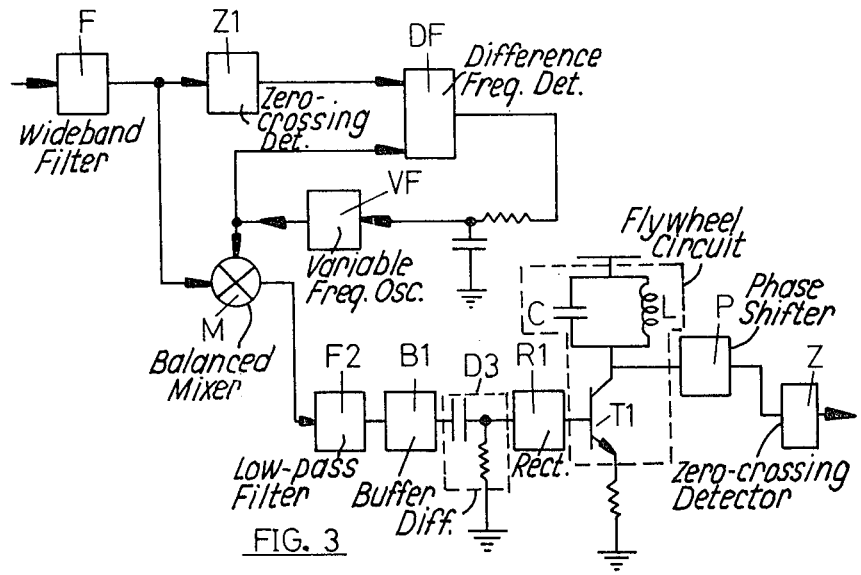

The circuit shown in FIG. 3 gives improved immunity to noise and to phase jumps due to hard commutation, as the scan information appears as maintained steps over each scan period rather than as a short pulse as in FIG. 2. The circuit of FIG. 3 in effect integrates the effect of the scan reversal transients over the entire time for which each phase change is maintained (the scan time).

The FIG. 3 circuit comprises a wideband filter F, a balanced mixer M, a zero crossing detector Z1, a difference frequency detector DF, a variable frequency oscillator VF, a low pass filter F2, a buffer B1, differentiator D3, rectifier R1, a flywheel circuit including a transistor T1 with a high-Q resonant (LC) circuit connected to its collector, a phase shifter P and a zero crossing detector Z.

Figure 5:
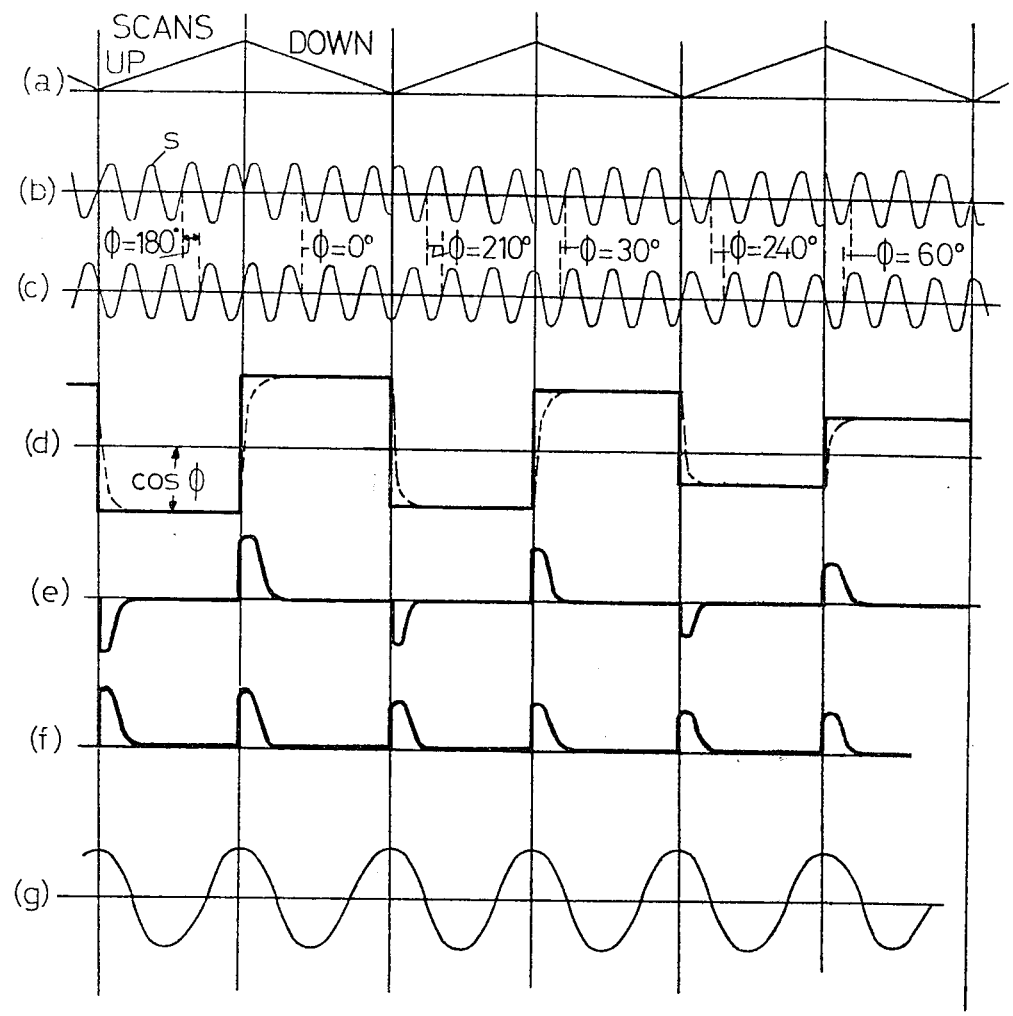

Referring also to FIG. 5, we again assume (as before) up and down scans, i.e. FIG. 4(a) repeated at 5(a), the Doppler beat signal, FIG. 5(b), after passing through the filter F for rejection of multipath (ground reflected) signals as before, is applied to one input of the balanced mixer M. The other input to the balanced mixer M is a continuous signal (FIG. 5(c)), from the oscillator VF whose frequency is controlled, via the zero crossing detector Z1 and the difference frequency detector DF, to equal the average zerocrossing rate of the beat signal.

The lower sideband output from the mixer is therefore near d.c. and ideally gives an output cos $\phi$ (FIG. 5(d)), where $\phi$ is the phase difference between the beat signal and the local oscillator.

The dashed outline in FIG. 5(d) represents the lower sideband signal after passing through the low pass filter F2.

Thereafter the signal is differentiated by the differentiator D3, output as shown in FIG. 5(e) and, after rectification by the rectifier R1 to give the waveform as shown FIG. 5(f), is used to ring the flywheel circuit having a resonant frequency equal to the scan rate, as in FIG. 2. Derivation of the scan timing signals for the counting stage 4 of the receivers via the 90° advance phase shifter P and the zero crossing detector Z, is as already described in connection with FIG. 2.

As an alternative to using a balance mixer, the beat waveform and the local oscillator signal may simply be added together, and an envelope amplitude detector used to give an indicator of $\phi$, with subsequent differentiation, rectification and flywheel circuit ringing to derive scan timing derivation signals.

The above described scan timing extraction arrangements also apply to an azimuth (horizontal) beacon with the defined scan format operating with left/right and right/left scans.

It is to be understood that the foregoing description of specific examples of this invention is made by way of example only and is not to be considered as a limitation on its scope.

What is claimed is:
1. A radio navigation receiver for use in a Doppler radio navigation system having a transmission format with digitized bidirectional scans, comprising:
   first means within said receiver for deriving a Doppler beat information signal from the received signals;
   second means comprising a flywheel circuit having a resonant frequency equal to the frequency of the scan, for determining the time at which the direction of each scan is reversed, said second means being responsive to said Doppler signal;
   and third means synchronized by said second means for determining the frequency of said Doppler signal during each scan.

2. Apparatus according to claim 1 in which said second means comprises means for the double differentiation and rectification of said Doppler signal to produce a synchronizing signal to maintain said flywheel circuit in oscillation.

3. Apparatus according to claim 1 in which said second means comprises a variable frequency oscillator, means for controlling the frequency of said oscillator to be equal to the average frequency of said Doppler signal, means for determining the phase relationship between the Doppler signal and the oscillator signal, and means responsive to said phase relationship determining the means to maintain said flywheel circuit in oscillation.

4. Apparatus according to claim 3 in which said phase relationship determining means comprises a balanced mixer having a lower sideband output resulting from the mixing of the Doppler signal and the oscillator signal.

* * * * *